(12) United States Patent
Caillaud et al.

(10) Patent No.: US 12,337,933 B2
(45) Date of Patent: Jun. 24, 2025

(54) GEAR SHIFT DEVICE AND ASSOCIATED MOBILITY MACHINE

(71) Applicant: VALEO EMBRAYAGES, Amiens (FR)

(72) Inventors: Jonathan Caillaud, Saint Quentin Fallavier (FR); Jean Baptiste Siegwart, Saint Quentin Fallavier (FR); Quentin Doret, Saint Quentin Fallavier (FR); Christophe Laurens, Saint Quentin Fallavier (FR); David Roumeas, Felines (FR)

(73) Assignee: VALEO EMBRAYAGES, Amiens (FR)

( * ) Notice: Subject to any disclaimer, the term of this patent is extended or adjusted under 35 U.S.C. 154(b) by 23 days.

(21) Appl. No.: 18/254,470

(22) PCT Filed: Nov. 26, 2021

(86) PCT No.: PCT/EP2021/083182
§ 371 (c)(1),
(2) Date: May 25, 2023

(87) PCT Pub. No.: WO2022/112506
PCT Pub. Date: Jun. 2, 2022

(65) Prior Publication Data
US 2024/0043090 A1   Feb. 8, 2024

(30) Foreign Application Priority Data

Nov. 27, 2020 (FR) ........................ 2012292
Dec. 16, 2020 (FR) ........................ 2013339

(51) Int. Cl.
*B62M 25/08* (2006.01)
*B62M 6/55* (2010.01)
*B62M 11/06* (2006.01)

(52) U.S. Cl.
CPC .............. *B62M 25/08* (2013.01); *B62M 6/55* (2013.01); *B62M 11/06* (2013.01)

(58) Field of Classification Search
CPC ......... B62M 25/08; B62M 6/55; B62M 11/06
(Continued)

(56) References Cited

U.S. PATENT DOCUMENTS 4,301,690 A * 11/1981 Cavenagh ............... F16H 63/16
74/363
6,978,692 B2 * 12/2005 Thery ..................... F16D 21/04
74/372

(Continued)

FOREIGN PATENT DOCUMENTS

CN   208870981 U   5/2019
EP   0 446 087 A1   9/1991
(Continued)

OTHER PUBLICATIONS

International Search Report issued Mar. 4, 2022 in PCT/EP2021/083182 filed on Nov. 26, 2021 2 pages.

*Primary Examiner* — Ha Dinh Ho
(74) *Attorney, Agent, or Firm* — Oblon, McClelland, Maier & Neustadt, L.L.P.

(57) ABSTRACT

A gear shift device for a mobility machine has a plurality of gears between a first gear referred to as gear No. 1 and a top gear. The gear shift device includes a series of input pinions arranged so as to turn freely around a selection shaft with an axis $X_2$, said selection shaft accommodating a worm screw and a shuttle. The gear shift device also includes a series of output pinions with an axis $X_3$ that rotate conjointly with a hollow shaft a gear shift actuator arranged so as to displace the shuttle along the worm screw between a plurality of positions and to engage a selected gear. A mobility machine can include the gear shift device.

20 Claims, 4 Drawing Sheets

(58) Field of Classification Search
USPC .......................................................... 74/335
See application file for complete search history.

(56) References Cited

U.S. PATENT DOCUMENTS

2016/0152303 A1* 6/2016 Bortoli ..................... B62M 9/12
  701/51
2020/0354006 A1* 11/2020 Schmitz ................. B62M 3/003
2024/0174324 A1* 5/2024 Laurens ................. B62M 11/06

FOREIGN PATENT DOCUMENTS

FR    2 805 587 A1    8/2001
FR    2 975 367 A1    11/2012

* cited by examiner

Fig. 3a
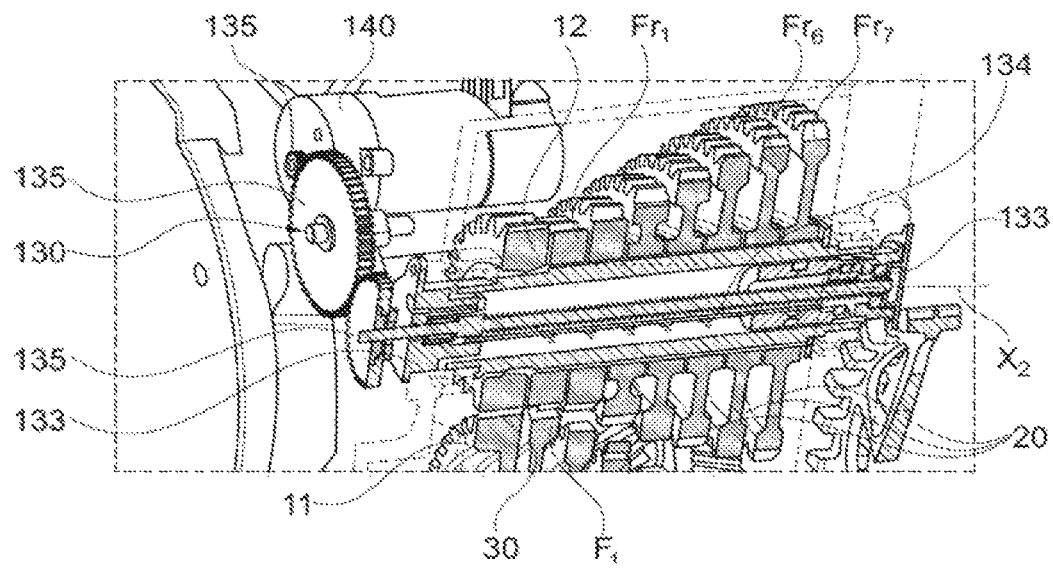
Fig. 3b
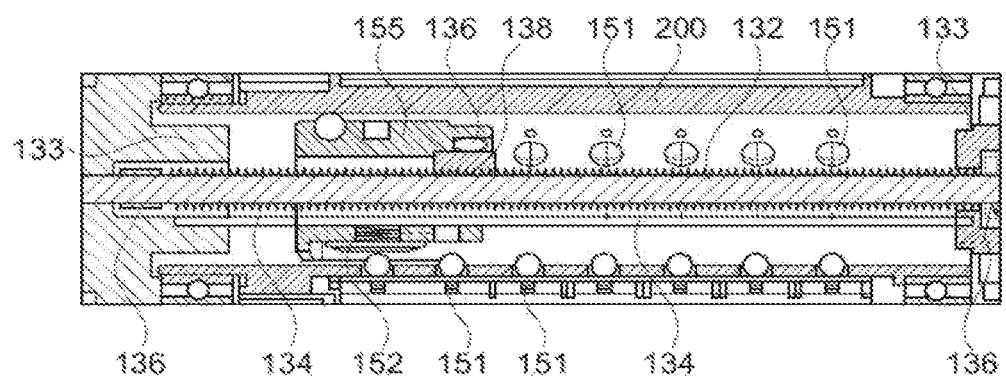
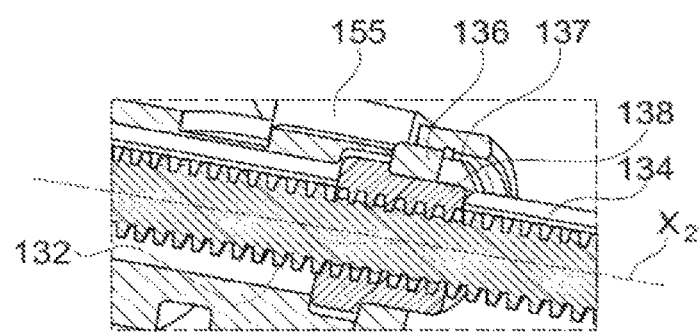
Fig. 3c

GEAR SHIFT DEVICE AND ASSOCIATED MOBILITY MACHINE

The field of the present invention is that of what is referred to as "soft" mobility, and more particularly that of mobility machines that combine electrical propulsion and muscular force, for example electrically assisted bicycles.

When cycling, the motive force is supplied by the cyclist and is transmitted to the wheels via a crank system turning about an axis of a crankset that drives the rear wheel, generally via a chain.

Gearboxes for cycles are known from the prior art. In particular, the publication FR2975367 A1 discloses a gear shift device for bicycles that has a gearbox and a sliding shuttle for selecting the gear. The axial displacement of the shuttle is controlled via two cables connected to a rotary handle positioned on the bicycle handlebar. This system requires many parts. It is complex to manufacture and maintain. In particular, the cable control requires precise and regular adjustment. There is a need to simplify and automate gearboxes for cycles.

As the field of light-duty crankset-powered vehicles for transporting goods or people diversifies, there is also a need for automatic and electric gearboxes.

In order to at least partly meet these needs, the subject of the invention, according to a first aspect, is a gear shift device for a mobility machine
said device having a plurality of k gears between a first gear, referred to as gear No. 1, and a top gear, referred to as gear k
said gear shift device having
a series of k input pinions arranged so as to turn freely around a selection shaft, said selection shaft accommodating a worm screw and a shuttle
a series of k output pinions that rotate conjointly with a hollow shaft, said hollow shaft being arranged in particular so as to surround an axis of the crankset of the mobility machine,
a gear shift actuator for displacing the shuttle along the worm screw between a plurality of k positions corresponding in particular to the gears No. 1 to the top gear and engaging a selected gear.

Each of the gears has a particular ratio between the output speed and the input speed of the gear shift device.

The number of positions of the shuttle is at least equal to the number of gears of the gear shift device.

Each gear corresponds to a particular position of the shuttle in which the input pinion of the selected gear meshes with the corresponding output pinion.

As soon as the user pedals, the hollow shaft turns, which drives the shuttle. By virtue of the invention, in the event of a gear shift, the worm screw is rotated by the gear shift actuator. The rotational movement of the worm screw is transformed into a translational movement of the shuttle, which is displaced into the position corresponding to the selected gear.

Here, the hollow shaft is a selection shaft, the two expressions being used equivalently in the present application.

The invention also provides a compact gear shift device with reduced bulk.

The worm screw driven by the gear shift actuator does away with the cables of the prior art and thus affords a more reliable solution which is easy to maintain.

The gear shift actuator has mechanical means for bringing about a translational movement of the shuttle, in particular means for transforming a rotational movement into a translational movement. The gear shift actuator also has electric means for moving the shuttle, in particular a reduction gearset. Advantageously, the gear shift device according to the invention has one or another of the following features, taken alone or in combination:

the shuttle is arranged so as, in each position corresponding to a gear, to engage an associated input pinion such that it meshes with the output pinion associated with said gear.
so as, in each position corresponding to a gear, to engage an input pinion such that it meshes with an output pinion, the input pinion and output pinion being associated with said gear.
the shuttle accommodating at least one return member, in particular arranged so as to cooperate with at least one ball of the selection shaft. By virtue of this ball/spring device, the shuttle can engage an input pinion such that it meshes with the associated output pinion. The shuttle may accommodate 1 or more return members, for example between one and six return members. For each gear ratio, the one or more return members cooperate with one or more balls of the selection shaft, for example between one and six balls. For a given gear ratio, the number of balls of the selection shaft is in particular less than or equal to the number of return members of the shuttle.
the shuttle surrounds the worm.
the gear shift device has between 2 and 12 gears, or even between 5 and 9 gears.
the gear shift device has a pivot connection.
the gear shift actuator has a motor and a reduction gear and/or an epicyclic gear train.

The reduction gear has in particular a plurality of pinions positioned between the motor and the worm. In the present application, the term "reduction gearset" is used to designate the motor, the reduction gear and/or the epicyclic gear train, depending on the embodiments.

the gear shift actuator is arranged so as to displace the shuttle between the predefined positions following a gear selection request from a rider of the mobility machine and/or from a control unit of the mobility machine.
the shuttle may adopt a position referred to as the neutral position in which no gear ratio is engaged. In other words, the shuttle is in a position in which it is not engaged with any input pinion/the input pinion/output pinion pairs do not mesh. In particular, when the shuttle is in the neutral position, expressed differently the gear shift device is in a neutral gear, the movement of the crankset does not propel the bicycle
the shuttle may adopt a reverse-movement position which, when it is triggered, propels the mobility machine in a reverse movement whilst pedalling still occurs going forwards.

According to a first embodiment, the shift device has a rail along which the shuttle is displaced. The rail is housed in particular in the selection shaft. The shuttle may have over its entire length at least one axial channel in which the rail is positioned. The channel, or one of the channels, thus serves to retain the rail.

When the gear ratio is not being shifted, the worm screw does not turn.

In the event of a gear-ratio shift, the worm screw is rotated by the gear shift actuator.

In particular, the shuttle is connected to the rail via a nut. The rail constitutes a linear abutment that prevents the rotation of the nut. The axial movement of the nut drives the shuttle and thus changes the gear.

In particular, the nut is accommodated inside the shuttle.

The rail and the nut are thus part of the mechanical means for bringing about a translational movement of the shuttle. They form a pivot connection between the worm screw and the shuttle, transforming the rotational movement of the worm screw into the translational movement of the shuttle.

According to a second embodiment, the gear shift device has at least one epicyclic gear train. The latter replaces the rail and the nut of the preceding embodiment. Here, the epicyclic gear train is part of the mechanical means for bringing about a translational movement of the shuttle. In particular, the epicyclic gear train is a double epicyclic reduction gear having an inner ring that is integral with the selection shaft and an outer ring that is integral with the worm. The two rings, inner and outer, are linked via at least three satellite pinions.

In the steady state of rolling, a gear is triggered, the shuttle is located in the position corresponding to said gear, this allowing the corresponding input and output pinions to mesh. The worm, the selection shaft and the shuttle turn at the same speed.

In order to perform a gear shift, the reduction gearset temporarily turns the outer ring through a determined angle which depends on the necessary displacement of the shuttle between the positions that respectively correspond to the initial gear and to the desired gear.

Following the angular deflection thus created between the inner ring and the outer ring, the ratio between the rotation of each ring is temporarily no longer equal to one. The shuttle is thus driven in a translational movement until it reaches a new position corresponding to the new gear that is selected.

According to another of its aspects, the invention relates to a transmission assembly for a mobility machine, said transmission assembly having an electric motor, in particular arranged so as to supply all or some of the energy for propelling the machine, and a gear shift device as described above.

According to yet another of its aspects, the invention relates to a mobility machine having a gear shift device, as described above.

The machine may have a rechargeable energy source, in particular a battery, for supplying power to the reduction gearset device. Said battery is preferably arranged so as to supply energy to the various members of the mobility machine, in particular the lighting, an optional locating/navigation system, etc., this list being non-limiting.

In one particular embodiment, the mobility machine is electrically assisted and has an electric motor, provided for example with a reduction gear. The mobility machine is in particular arranged such that the electric motor can supply the torque when the instantaneous speed of the mobility machine is less than a threshold value.

In another embodiment, the mobility machine is not electrically assisted.

According to yet another of its aspects, the invention relates to a method for controlling a gear shift device, as described above.

In particular, the method has a step of triggering a selected gear of the gear shift device. During this step, a control unit controls the gear shift actuator on the basis of an order on the part of the user indicating the chosen gear.

BRIEF DESCRIPTION OF THE FIGURES

Other features, details and advantages of the invention will become more clearly apparent upon reading the description given below by way of indication, with reference to the drawings, in which.

DETAILED DESCRIPTION OF THE INVENTION

Figure 1:
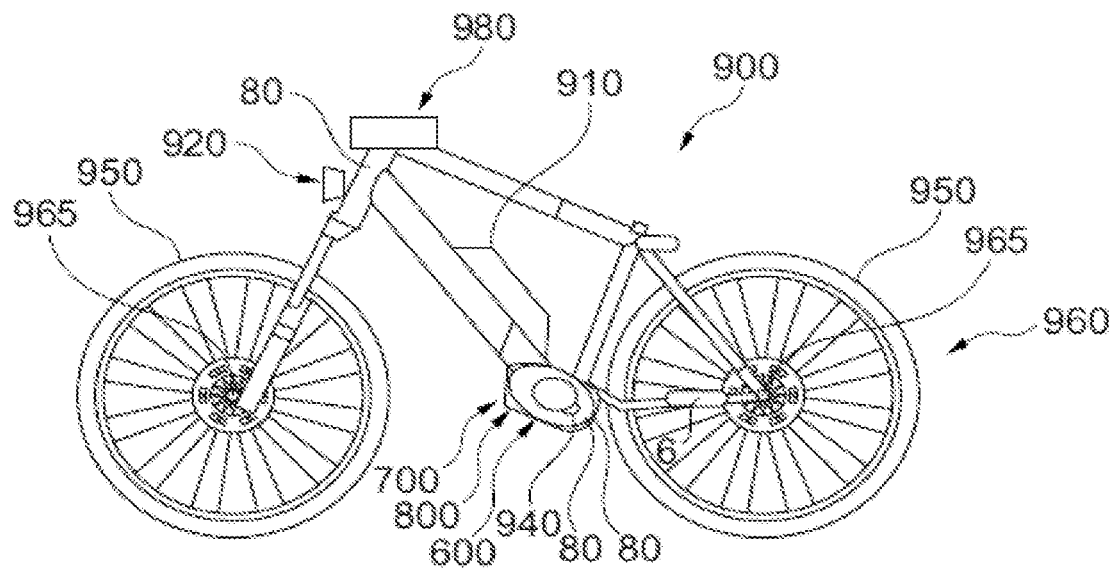
FIG. 1 is a view of a mobility machine according to one of the aspects of the invention.

FIG. 1 illustrates a mobility machine 900 according to one of the aspects of the invention. Here, the machine 900 is an electrically assisted bicycle having an electric motor 300 with an axis of rotation $X_m$. Said electric motor is arranged so as to provide some of the propulsion of said machine.

When travelling without electrical assistance, the motive force is supplied by the cyclist and is transmitted to the wheels 950 via two pedals turning about an axis Xp of a crankset that drives the rear wheel via a chain.

As shown in FIG. 1, the machine 900 has a control unit 800 and multiple sensors 80, located in particular at the crankset, on the bicycle frame or at a wheel.

Here, the machine 900 also has an energy storage device in the form of a battery 910, a lighting system 920, a crankset 940 with an axis Xp, a locating and/or navigation system 980, and a human/machine interface system 990 having in particular a touch screen that can display information for and/or take into account the requests of said user. The human/machine interface system 990 is in particular connected to the locating system 980 and acts as a navigation interface. The invention is not limited to a particular human/machine interface system, and may have any system that is known to a person skilled in the art.

The wheels 950 are provided with a braking system 960, having in particular disk brakes 965.

Figure 2:
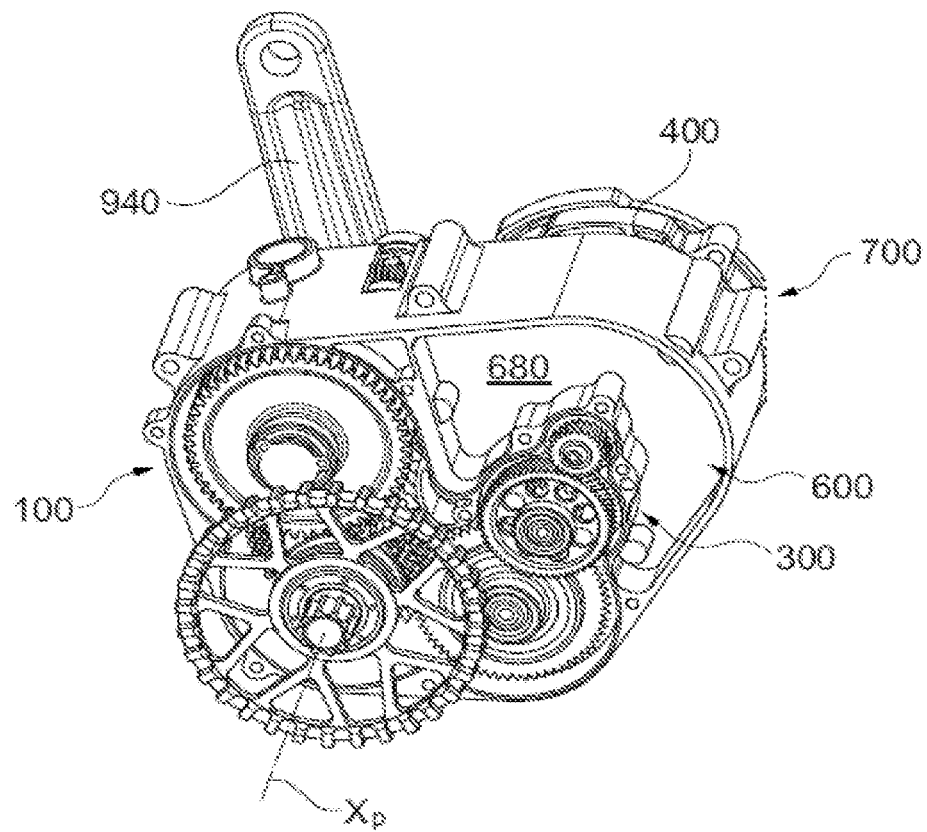
FIG. 2 illustrates the transmission assembly of the mobility machine of FIG. 1, FIG. 3a, FIG. 3b and FIG. 3c show various sectional views of a gear shift device according to a first embodiment of the invention.

The machine 900 has a transmission assembly 700, illustrated in FIG. 2. The transmission assembly 700 has a gear shift device 100 according to the invention and an electric motor 300 with an axis of rotation Xm for supplying some of the power for propelling the machine 900.

The transmission assembly 700 is at least partially accommodated in a casing 600 (illustrated in FIG. 4), positioned here at the crankset 940, the axis of which coincides with the output axis $X_3$ of the gear shift device 100.

The gear shift is automatic and electric.

The gear shift device 100 illustrated in FIG. 3a et seq. has a plurality of 7 gears between a first gear referred to as gear No. 1 and a top gear referred to as gear 7.

It has a series of 7 output pinions 30 with an axis $X_3$, of reference $F_1$ to $F_7$, that rotate conjointly with a hollow shaft, and a series of 7 input pinions 20, of reference $Fr_1$ to $Fr_7$, that are arranged so as to turn freely around a selection shaft 200. The latter accommodates a shuttle 155 surrounding a worm screw 132 of the gear shift device 100. A gear shift actuator 150 is arranged so as to displace the shuttle 155 along the worm screw 132 between 7 positions from $P_1$ to $P_7$ and to engage a selected gear.

The device is compact, the selection shaft 200 is hollow.

The gear shift device 150 includes electric means for moving the shuttle, in the form of a reduction gearset. This reduction gearset has a motor 140 and a reduction gear 130. The gear shift actuator 150 also has mechanical means for bringing about a translational movement of the shuttle 155, in particular means for transforming a rotational movement into a translational movement.

Here, the reduction gearset assembly has a pinion 135 on the axis of the worm screw 132, an intermediate pinion 135 and a pinion 135 on the axis Xm of the motor 140. The teeth of the pinion 135 may be straight, as illustrated, or helical, in a variant which is not illustrated.

As shown in FIG. 3*a*, the gears are shifted by a sliding shuttle 155 underneath the free pinions 30 of the gearbox.

The gear shift actuator 150 axially displaces the shuttle along a worm screw 132 via a helical kinematic connection.

The shuttle 155 therefore stops underneath the input pinion $Fr_I$ that corresponds to the selected gear i. A spring/ball system as described in the French patent application FR2975367 A1 (illustrated here in more detail in FIG. 5) prevents the rotation of said input pinion Fri. Once it is triggered, the input pinion Fri meshes with and transmits forces to the output pinion Fi, and thus to the chain sprocket linked to the bicycle wheel.

The rotational guidance of the worm screw 132 is ensured using bearings at each of its ends, for example. FIG. 3*a* illustrates in particular a needle bushing on the side of the pinions 135 of the reduction gear 130 and a ball bearing at the other end of the worm screw 132.

FIGS. 3*b* and 3*c* show detail views of the gear shift device of FIG. 3*a*.

Whereas the shuttle 155 is illustrated in FIG. 3*a* in the position $P_7$ corresponding to a gear No. 7, here the top gear, and engages the input pinion $Fr_7$ such that it meshes with the output pinion $F_7$, in FIG. 3*b* the shuttle 155 is in the position $P_1$ corresponding to a gear No. 1 and engages the input pinion $Fr_1$ by virtue of a ball/spring device. The shuttle 155 houses a return member 152 that cooperates with a ball 151 of the selection shaft 200.

The shuttle 155 is moreover connected to a rail 134 by a nut 138.

If the machine 900 rolls in a gear i, without it being shifted, the worm screw 132 does not turn. As shown in FIG. 3*c*, the shuttle 155 surrounding the nut 138 can turn by virtue of the bearing 136, retained by a clip 137 here.

In the event of a gear-ratio shift, the worm screw 132 is rotated by the gear shift actuator 150. The worm screw 132 is rotated by the gear shift actuator 150, this causing the axial movement of the nut 138 which drives the shuttle 155 and thus changes the gear. The pivot connection thus implemented transforms the rotational movement of the worm screw 132 into the translational movement of the shuttle 155. A stop 133 limits the displacement of the shuttle 155 at each end. The stops 133 are for example hollow, as illustrated, and accommodate bearings 136 that serve to support and guide the worm screw 132.

In a variant which is not shown, the shuttle 155 may adopt a position referred to as the neutral position P0 in which no gear ratio is engaged.

In the example of the gear shift device described above, the gear shift actuator 150 has straight pinions. In the context of the invention, the reduction gearset may have helical pinions.

Figure 4:
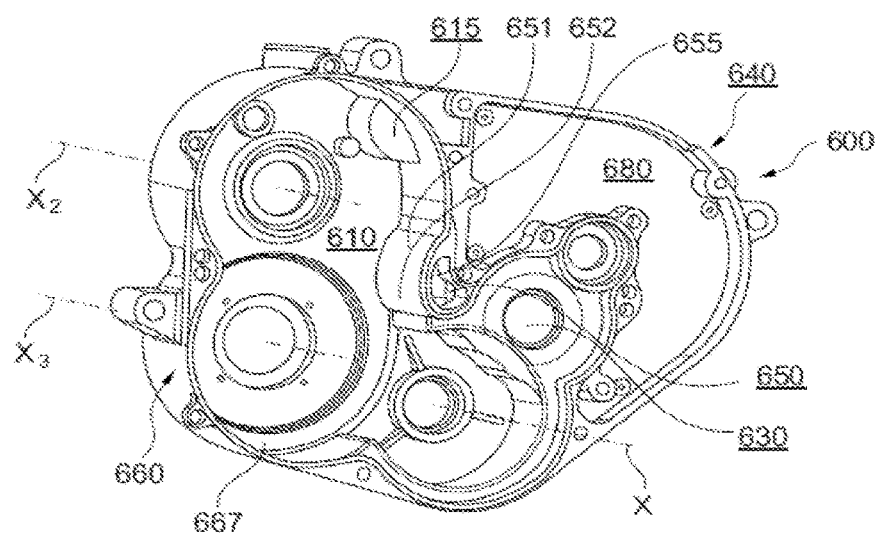
FIG. 4 illustrates a casing that accommodates a gear shift device according to the invention.

FIG. 4 illustrates the casing 600 for the mobility machine 900 of FIG. 1 in more detail.

The casing 600 has a crankcase 660 that delimits a first housing 610 arranged so as to accommodate the gearings of the gear shift device 100. The crankcase 660 also delimits multiple second housings that are separate from one another. The housings 640, 630, 615 and 680 are arranged so as to accommodate the electric motor 400, the reduction gear 300, the gear shift actuator 150 and the control unit 800 of the mobility machine, respectively. The second housings are preferably sealed, in particular that one which is arranged so as to contain the control unit 800.

The crankcase 660 accommodating the gear shift device 100 is closed by two lateral flanges 667. The casing 600 is illustrated empty and with just one flange 667 in FIG. 4 in order to make the various first and second housings more visible. The first housing 610 has two facing holes in the lateral flanges 667 for receiving the axle of crankset spindle of the mobility machine 900.

Figure 5:
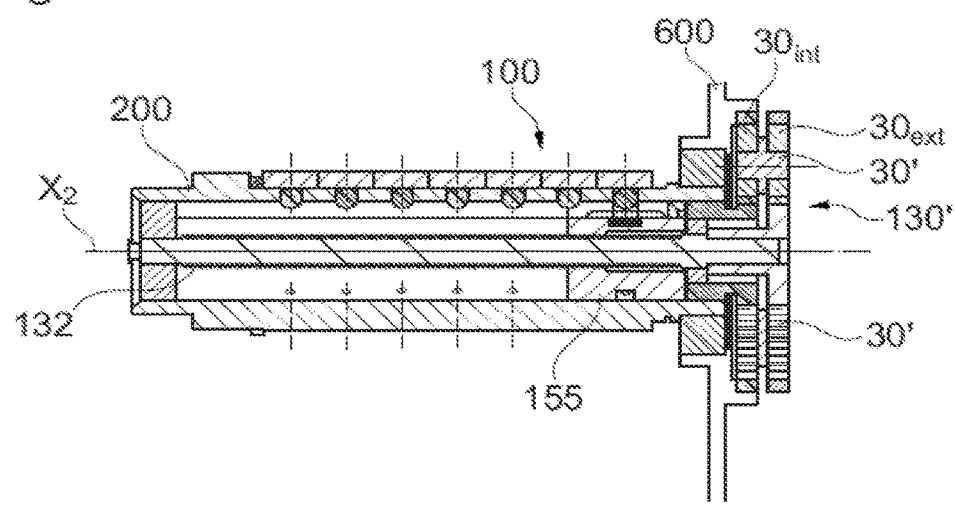
FIG. 5 and FIG. 6 illustrate a gear shift device according to a second embodiment of the invention in section, FIG. 7a to FIG. 7g schematically show different variants of a gear shift actuator according to the first embodiment of the invention, and FIG. 8a to FIG. 8g schematically show different variants of a gear shift actuator according to the second embodiment of the invention.
Figure 6:
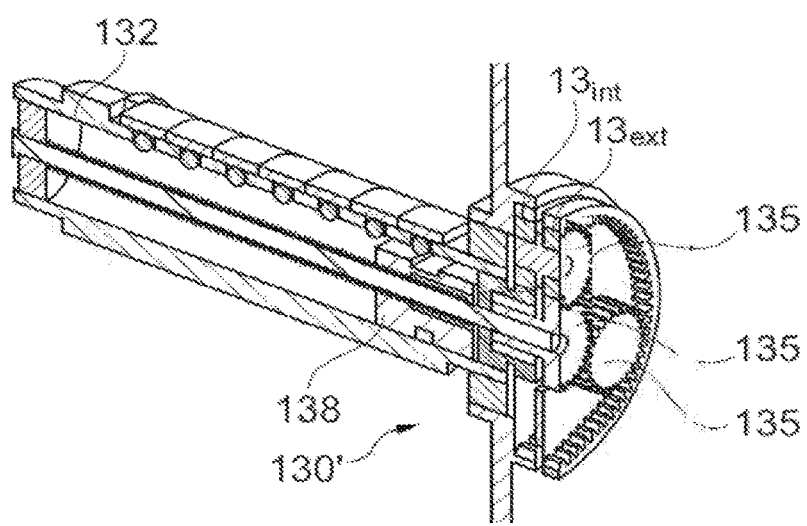

FIGS. 5 and 6 relate to the second embodiment. The gear shift device 100 has an epicyclic gear train 130' having an inner ring 30 int that is integral with the selection shaft 200 and an outer ring 30 ext that is integral with the worm screw 132. The inner ring 30 int and the outer ring 30 ext are linked by three satellite pinions 135.

In the steady state of rolling, the worm screw 132, the selection shaft 200 and the shuttle 155 turn at the same speed. In order to shift gears, the reduction gearset 140 temporarily turns the outer ring through a determined angle that depends on the necessary displacement of the shuttle 155 between the positions that respectively correspond to the initial gear and to the desired gear. Following the angular deflection thus created between the inner ring 30 int and the outer ring 30 ext, the ratio between the rotation of each ring is temporarily no longer equal to one. The shuttle 155 is thus driven in a translational movement until it reaches a new position corresponding to the new gear that is selected.

The first embodiment with a rail and nut is not limited to one type of reduction gearset having pinions with parallel axes, as illustrated in FIG. 3*a*. The axes of the pinions of the reduction gearset may be perpendicular.

Figure 7A:
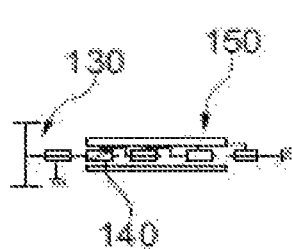

Whereas in the illustrated variants of the first embodiment, in particular the example illustrated in FIG. 3*a*, the reduction gearset has multiple pinions 135, FIG. 7*a* corresponds to an example in which the reduction gearset 130 is limited to a single pinion.

Figure 7B:
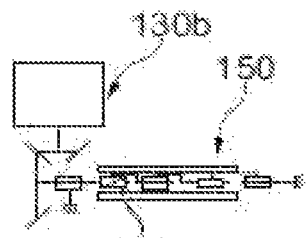

FIG. 7*b* illustrates a variant in which the gear shift actuator 150 has a conical gearing $130_b$.

Figure 7C:
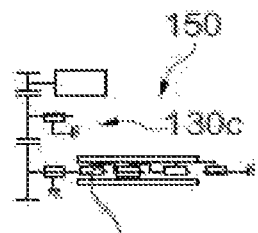

FIG. 7*c* illustrates a variant in which the gear shift actuator 150 has a straight-cut or helical gearing $130_c$ with one or more stages.

Figure 7D:
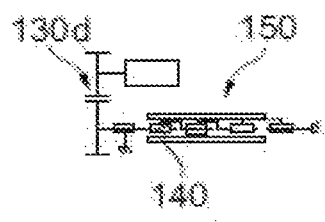

FIG. 7*d* illustrates a variant in which the gear shift actuator 150 has a continuously variable straight-cut or helical gearing $130_d$.

Figure 7E:
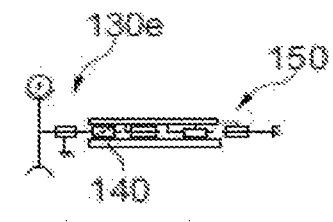

FIG. 7*e* illustrates a worm screw $130_e$ of a variant of the gear shift actuator 150.

Figure 7F:
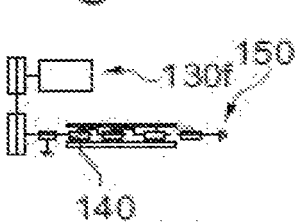
Figure 7G:
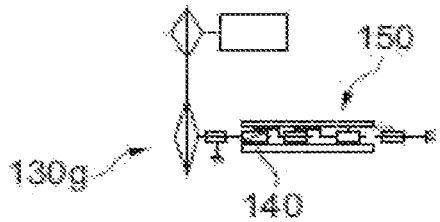

FIGS. 7*f* and 7*g* show variants having a gear shift actuator 150 with a belt $130_f$ and a chain $130_g$, respectively.

Similarly, FIGS. 8*a* to 8*g* schematically show different variants of a gear shift actuator according to the second embodiment of the invention.

Figure 8A:

FIG. 8*a* corresponds to the example illustrated in FIG. 5*a* with the epicyclic gear train 130'.

Figure 8B:
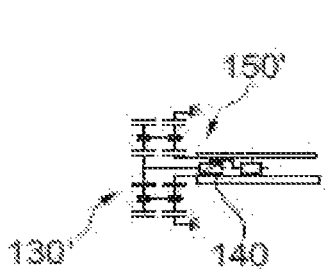

FIG. 8b illustrates a variant in which the gear shift actuator $150_b$ has an epicyclic gear train 130' and a conical gearing.

Figure 8C:
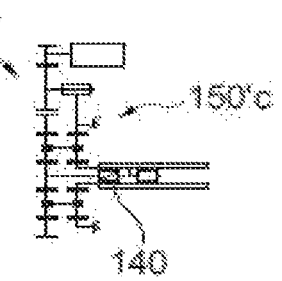
Figure 8D:
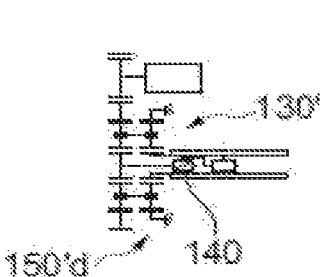
Figure 8E:
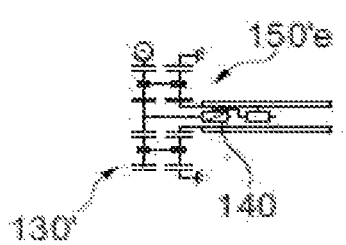
Figure 8F:
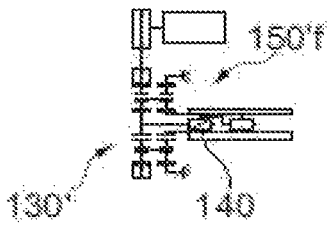
Figure 8G:
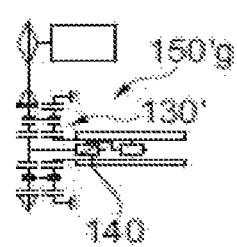

FIG. 8c illustrates a variant in which the gear shift actuator $150_c$ has an epicyclic gear train 130' and a straight-cut or helical gearing with one or more stages. FIG. 8d illustrates a variant in which the gear shift actuator $150_d$ has an epicyclic gear train 130' and a continuously variable straight-cut or helical gearing. FIG. 8e illustrates a variant in which the gear shift actuator $150_e$ has an epicyclic gear train 130' and a worm. FIGS. 8f and 8g show variants having a gear shift actuator $150_f$ with an epicyclic gear train 130' and a belt, and a gear shift actuator $150_g$ with an epicyclic gear train 130' and a chain, respectively.

The invention claimed is:

1. A gear shift device for a mobility machine, the gear shift device comprising:
   a plurality of k gears between a first gear referred to as gear No. 1 and a top gear as gear k;
   a series of k input pinions arranged so as to turn freely around a selection shaft with an axis $X_2$, said selection shaft accommodating a worm screw and a shuttle;
   a series of k output pinions with an axis $X_3$ that rotate conjointly with a hollow shaft being arranged so as to surround an axis of a crankset of the mobility machine; and
   a gear shift actuator arranged so as to displace the shuttle along the worm screw between a plurality of k positions and to engage a selected gear.

2. The gear shift device according to claim 1, wherein the shuttle is arranged so as, in each position corresponding to a gear, to engage an input pinion such that the input pinion meshes with the output pinion, the input pinion and output pinion being associated with said gear.

3. The gear shift device according to claim 1, wherein the shuttle is arranged so as to accommodate at least one return member.

4. The gear shift device according to claim 1, wherein the shuttle surrounds the worm screw.

5. The gear shift device according to claim 1, further comprising a pivot connection.

6. The gear shift device according to claim 1, wherein the gear shift actuator has a motor, and a reduction gear or an epicyclic gear train.

7. The gear shift device according to claim 1, wherein the gear shift actuator is arranged so as to displace the shuttle between a predefined positions following a gear selection request from a rider of the mobility machine and/or from a control unit of the mobility machine.

8. The gear shift device according to claim 1, wherein the shuttle can adopt a position referred to as a neutral position in which no gear ratio is engaged.

9. The gear shift device according to claim 1, further comprising a rail along which the shuttle is displaced, said rail being located in the selection shaft.

10. The gear shift device according to claim 1, further comprising an epicyclic gear train with an inner ring and an outer ring.

11. An Electrically assisted mobility machine, having a gear shift device according to claim 1.

12. The gear shift device according to claim 2, wherein the shuttle is arranged so as to accommodate at least one return member.

13. The gear shift device according to claim 2, wherein the shuttle surrounds the worm screw.

14. The gear shift device according to claim 2, further comprising a pivot connection.

15. The gear shift device according to claim 2, wherein the gear shift actuator has a motor, and a reduction gear or an epicyclic gear train.

16. The gear shift device according to claim 2, wherein the gear shift actuator is arranged so as to displace the shuttle between a predefined positions following a gear selection request from a rider of the mobility machine and/or from a control unit of the mobility machine.

17. The gear shift device according to claim 2, wherein the shuttle can adopt a position referred to as a neutral position in which no gear ratio is engaged.

18. The gear shift device according to claim 2, further comprising a rail along which the shuttle is displaced, said rail being located in the selection shaft.

19. The gear shift device according to claim 2, further comprising an epicyclic gear train with an inner ring and an outer ring.

20. An Electrically assisted mobility machine, having a gear shift device according to claim 2.

* * * * *